US011559768B2

(12) United States Patent
Chinzei et al.

(10) Patent No.: US 11,559,768 B2
(45) Date of Patent: Jan. 24, 2023

(54) EXHAUST GAS PURIFICATION CATALYST

(71) Applicants: Isao Chinzei, Toyota (JP); Masahide Miura, Toyota (JP); Seiji Nakahigashi, Toyota (JP); Hiromasa Suzuki, Toyota (JP); Akira Morikawa, Nagakute (JP); Toshio Yamamoto, Nagakute (JP); Satoru Katoh, Nagakute (JP); Takashi Onozuka, Kakegawa (JP); Hirotaka Ori, Kakegawa (JP); Mitsuyoshi Okada, Kakegawa (JP); Sho Hoshino, Kakegawa (JP)

(72) Inventors: Isao Chinzei, Toyota (JP); Masahide Miura, Toyota (JP); Seiji Nakahigashi, Toyota (JP); Hiromasa Suzuki, Toyota (JP); Akira Morikawa, Nagakute (JP); Toshio Yamamoto, Nagakute (JP); Satoru Katoh, Nagakute (JP); Takashi Onozuka, Kakegawa (JP); Hirotaka Ori, Kakegawa (JP); Mitsuyoshi Okada, Kakegawa (JP); Sho Hoshino, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 180 days.

(21) Appl. No.: 16/851,777

(22) Filed: Apr. 17, 2020

(65) Prior Publication Data

US 2020/0353411 A1 Nov. 12, 2020

(30) Foreign Application Priority Data

May 9, 2019 (JP) .............................. JP2019-088708

(51) Int. Cl.
*B01D 53/00* (2006.01)
*B01D 53/94* (2006.01)
*B01J 23/40* (2006.01)
*F01N 3/28* (2006.01)
*B01J 35/04* (2006.01)

(52) U.S. Cl.
CPC .......... *B01D 53/9459* (2013.01); *B01J 23/40* (2013.01); *F01N 3/281* (2013.01); *B01J 35/04* (2013.01)

(58) Field of Classification Search
CPC ....... B01D 53/9459; B01J 23/40; B01J 35/04; F01N 3/281
USPC ...................................................... 423/213.2
See application file for complete search history.

(56) References Cited

U.S. PATENT DOCUMENTS

| 2010/0101212 | A1 | 4/2010 | Iwachido et al. |
| 2018/0106174 | A1* | 4/2018 | Suzuki ................ B01J 35/1076 |
| 2018/0243690 | A1 | 8/2018 | Suzuki et al. |
| 2018/0252132 | A1 | 9/2018 | Suzuki et al. |

FOREIGN PATENT DOCUMENTS

| CN | 107360714 A | 11/2017 |
| CN | 107405615 A | 11/2017 |
| CN | 107427826 A | 12/2017 |
| JP | 2010104897 A | 5/2010 |
| JP | 2012240027 A | 12/2012 |
| JP | 2016185495 A | 10/2016 |
| JP | 2017100073 A | 6/2017 |
| JP | 2017104825 A | 6/2017 |
| JP | 2017115690 A | 6/2017 |

* cited by examiner

*Primary Examiner* — Steven J Bos
(74) *Attorney, Agent, or Firm* — Dickinson Wright, PLLC

(57) ABSTRACT

The present disclosure provides the exhaust gas purification catalyst with the improved purification performance under the high Ga condition and the transient state in which an A/F repeats rich and lean phases. The present disclosure relates to an exhaust gas purification catalyst comprising a catalyst coating layer on a substrate, the catalyst coating layer containing a noble metal, a composite oxide containing cerium oxide and zirconium oxide, and a composite oxide containing aluminum oxide, wherein in the catalyst coating layer: an average thickness of the coating layer is in a range from 20 μm to 100 μm; a porosity measured by a weight-in-water method is in a range from 50% by volume to 80% by volume; and high-aspect-ratio pores having an aspect ratio of 5 or more account for 0.5% by volume to 50% by volume of a whole volume of voids, the high-aspect-ratio pore having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50, and wherein the noble metal is supported on peripheries of the voids, the composite oxide containing the cerium oxide and the zirconium oxide, and the composite oxide containing the aluminum oxide.

4 Claims, 6 Drawing Sheets

EXHAUST GAS PURIFICATION CATALYST

CROSS REFERENCE TO RELATED APPLICATIONS

The present application claims priority from Japanese patent application JP 2019-088708 filed on May 9, 2019, the content of which is hereby incorporated by reference into this application.

BACKGROUND

Technical Field

The present disclosure relates to an exhaust gas purification catalyst. More specifically, the present disclosure relates to an exhaust gas purification catalyst featuring that a noble metal is supported on peripheries of voids and all carrier materials in a catalyst coating layer having high-aspect-ratio pores at a certain rate.

Description of Related Art

Exhaust gas discharged from an internal combustion engine of an automotive or the like includes harmful gases such as carbon monoxide (CO), nitrogen oxides (NOx), and unburned hydrocarbon (HC). An exhaust gas purification catalyst for decomposition of such harmful gases is also referred to as a "three-way catalyst", and commonly has a honeycomb-shaped monolith substrate made of cordierite or the like and a catalyst coating layer formed thereon by wash coating of a slurry including noble metal particles having catalytic activity and an auxiliary catalyst having oxygen storage capacity (OSC).

Various approaches have been made in order to enhance purification efficiency of the exhaust gas purification catalyst. There is known, for example, a procedure where a void is formed in a catalyst coating layer in order to enhance diffusivity of exhaust gas in the catalyst coating layer. For example, known methods for forming a void in a catalyst coating layer involve increasing the particle size of a catalyst particle, or use of a pore-forming material which disappears in firing of a catalyst at the final stage of production to provide a void. For example, JP 2010-104897 A describes a method where a void is provided by adding magnesia having a particle size of 0.1 to 3.0 μm to form a catalyst layer.

If a void is provided in a catalyst layer, however, the thickness of the catalyst layer may be increased due to the void, and therefore the pressure loss of the catalyst may be increased to cause engine output power and/or fuel efficiency to be lowered. In addition, due to the void provided by any of the above methods, for example, the strength of the catalyst layer may be decreased, or a sufficient effect may be not obtained because of poor void linkage. In view of the above, for example, JP 2012-240027 A describes a method where a carbon compound material having a predetermined shape is mixed and is allowed to disappear in catalyst firing to thereby provide a void in a catalyst layer, the void having a mode in the frequency distribution with respect to the depth to length ratio (D/L) in the cross section of 2 or more.

Meanwhile, a technique to support a noble metal to a catalyst coating layer to control a support density and a supported part of the noble metal has been studied. For example, JP 2017-104825 A discloses a catalytic converter that includes a substrate and a catalyst layer. The substrate has a cell structure through which an exhaust gas flows. The catalyst layer is formed on cell wall surfaces of the substrate. The catalyst layer includes a first catalyst layer on an upstream in an exhaust gas flow direction and a second catalyst layer on a downstream in the exhaust gas flow direction. The first catalyst layer includes a noble metal catalyst at a uniform concentration in a thickness direction. The second catalyst layer has a concentration distribution in which the concentration of the noble metal catalyst decreases from a superficial layer to the substrate side. Starting from an end portion on the upstream of the substrate, the first catalyst layer is formed in a range from 10 to 90% of an overall length of the substrate. In a case where, in the second catalyst layer, a 20% range of a total thickness from the superficial layer of the second catalyst layer is define as a superficial layer portion, a 20% range of a total thickness from an end surface on the substrate side of the second catalyst layer is define as a deep portion, a concentration of the noble metal catalyst in the superficial layer portion is denoted as A (% by mass), and a concentration of the noble metal catalyst in the deep portion is denoted as B (% by mass), AB is larger than 1.

Furthermore, JP 2017-115690 A discloses an exhaust emission purification device that includes a trap catalyst and an oxidation catalyst. The trap catalyst is disposed on an exhaust passage of an engine and has a function that absorbs and reduces nitrogen oxide in an exhaust gas. In the trap catalyst, a noble metal support density on a superficial layer side is set higher than that on a base layer side. The oxidation catalyst is disposed on an upstream side with respect to the trap catalyst and has a function that oxidizes the nitrogen oxide. In the oxidation catalyst, a noble metal support density on the base layer side is set higher than that of the superficial layer side.

SUMMARY

In compliance to a strict emissions regulation, such as the SULEV20, it is desired to improve a purification performance under a condition of a high intake air mass in acceleration or the like (a high intake air mass or under a high Ga condition: being the same as a high space velocity or under a high SV condition) in a transient state in which an air fuel ratio (A/F) repeats rich and lean phases. In such a field, even JP 2010-104897 A, JP 2012-240027 A, JP 2017-104825 A, and JP 2017-115690 A in which an improvement in the purification performance has been recognized need to use a large amount of the expensive noble metal for compliance to a further strict emissions regulation. That is, in the light of the cost, a new noble metal supporting technique to improve the purification performance with a further small amount of noble metal is required.

Accordingly, an object of the present disclosure is to provide an exhaust gas purification catalyst with an improved purification performance under a high Ga condition and a transient state in which an A/F repeats rich and lean phases.

As a result of intensive studies, the present inventors have found the following and have completed the present disclosure. In a catalyst coating layer having high-aspect-ratio pores excellent in communicability and excellent in gas diffusivity prepared by using organic fibers having a predetermined shape as a pore-forming material, a noble metal is supported on peripheries of voids and all carrier materials (a composite oxide containing cerium oxide and zirconium oxide and a composite oxide containing aluminum oxide). This improves a NOx conversion performance under a high Ga condition and in a transient state in which an A/F repeats rich and lean phases.

That is, the gist of the present disclosure is as follows.

(1) An exhaust gas purification catalyst comprising a catalyst coating layer on a substrate, the catalyst coating layer containing a noble metal, a composite oxide containing cerium oxide and zirconium oxide, and a composite oxide containing aluminum oxide,
wherein in the catalyst coating layer:
an average thickness of the coating layer is in a range from 20 µm to 100 µm;
a porosity measured by a weight-in-water method is in a range from 50% by volume to 80% by volume; and
high-aspect-ratio pores having an aspect ratio of 5 or more account for 0.5% by volume to 50% by volume of a whole volume of voids, the high-aspect-ratio pore having an equivalent circle diameter in a range from 2 µm to 50 µm in a cross-sectional image of a catalyst coating layer cross section perpendicular to an exhaust gas flow direction of the substrate and having an average aspect ratio in a range from 10 to 50, and
wherein the noble metal is supported on peripheries of the voids, the composite oxide containing the cerium oxide and the zirconium oxide, and the composite oxide containing the aluminum oxide.

(2) The exhaust gas purification catalyst according to (1),
wherein in the catalyst coating layer, the high-aspect-ratio pore is oriented such that a value of an 80% cumulative angle, in a cumulative angle distribution on an angle basis, of an angle (cone angle) between a vector in a longitudinal direction of the high-aspect-ratio pore and a vector in the exhaust gas flow direction of the substrate is in a range from 0 to 45 degrees.

(3) The exhaust gas purification catalyst according to (1) or (2),
wherein in the catalyst coating layer, an amount of coating is in a range from 50 g/L to 300 g/L based on a unit volume of the substrate.

(4) A method for producing an exhaust gas purification catalyst comprising a catalyst coating layer on a substrate, the method comprising
mixing a noble metal raw material with a catalytic activity, composite oxide particles containing aluminum oxide, composite oxide particles containing cerium oxide and zirconium oxide, and a fibrous organic substance in an amount of 0.5 parts by mass to 9.0 parts by mass based on 100 parts by mass of the composite oxide particles containing the aluminum oxide and the composite oxide particles containing the cerium oxide and the zirconium oxide to prepare a catalyst slurry,
wherein the fibrous organic substance has an average fiber diameter in a range from 1.7 µm to 8.0 µm and an average aspect ratio in a range from 9 to 40, and
applying the catalyst slurry on the substrate and subsequently firing to remove at least a part of the fibrous organic substance and to form the catalyst coating layer on the substrate.

(5) The method according to (4),
wherein the composite oxide particles containing the cerium oxide and the zirconium oxide, the composite oxide particles containing the aluminum oxide, and the fibrous organic substance are mixed in order in a solution containing the noble metal raw material and stirred each time after the mixture to prepare the catalyst slurry.

Effects

The present disclosure provides the exhaust gas purification catalyst with the improved purification performance under the high Ga condition and the transient state in which an A/F repeats rich and lean phases.

DETAILED DESCRIPTION OF THE EMBODIMENTS

[Exhaust Gas Purification Catalyst]

Figure 1:
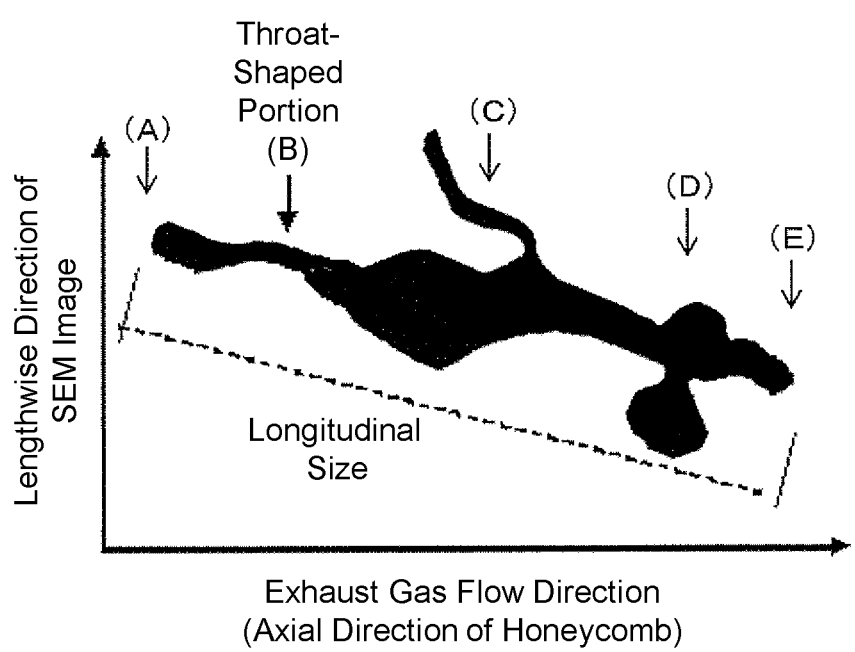
FIG. 1 is a two-dimensional projection diagram exemplifying three-dimensional information on a pore obtained by analyzing a continuous cross-sectional image of a catalyst coating layer cross section perpendicular to an exhaust gas flow direction of a substrate of an exhaust gas purification catalyst of the present disclosure.

The exhaust gas purification catalyst of the present disclosure includes a catalyst coating layer on a substrate. The catalyst coating layer contains a noble metal, a composite oxide containing cerium oxide and zirconium oxide, and a composite oxide containing aluminum oxide. In the catalyst coating layer, an average thickness is in a range from 20 µm to 100 µm, a porosity measured by a weight-in-water method is in a range from 50% by volume to 80% by volume, and high-aspect-ratio pores having an aspect ratio of 5 or more account for 0.5% by volume to 50% by volume of a whole volume of voids. The high-aspect-ratio pore has an equivalent circle diameter in a range from 2 µm to 50 µm in a cross-sectional image of a catalyst coating layer cross section perpendicular to an exhaust gas flow direction of the substrate and has an average aspect ratio in a range from 10 to 50. The noble metal is supported on peripheries of the voids, the composite oxide containing the cerium oxide and the zirconium oxide, and the composite oxide containing the aluminum oxide.

(Substrate)

A known substrate having a honeycomb shape can be used as the substrate of the exhaust gas purification catalyst of the present disclosure, and a honeycomb-shaped monolith substrate (honeycomb filter, high-density honeycomb or the like) or the like may be adopted. The material of such a substrate is also not particularly limited, and a substrate made of ceramics such as cordierite, silicon carbide, silica, alumina, and mullite, or a substrate made of a metal such as stainless steel including chromium and aluminum may be adopted. In some embodiments, cordierite may be used among them in terms of cost.

(Catalyst Coating Layer)

The catalyst coating layer in the exhaust gas purification catalyst of the present disclosure is formed on a surface of the substrate, and may be configured from one layer or two or more layers, namely, two layers, three layers, or four or more layers. Each catalyst coating layer needs not to be necessarily uniform over the entire substrate of the exhaust gas purification catalyst, and may have a different composition depending on each part of the substrate, for example, depending on each of an upstream zone and a downstream zone in an exhaust gas flow direction. In a case where the catalyst coating layer is configured from two or more layers, the catalyst coating layer can be classified into a catalyst coating layer as an uppermost layer and catalyst coating layer(s) present below the layer. As described later, the catalyst coating layer as the uppermost layer has a structure having the large number of voids and supporting the noble metal on peripheries of the voids, the composite oxide containing the cerium oxide and the zirconium oxide, and the composite oxide containing the aluminum oxide.

The catalyst coating layer contains a noble metal serving as a main catalyst, a composite oxide containing cerium oxide and zirconium oxide, a composite oxide containing aluminum oxide, and the like.

The composite oxide containing the aluminum oxide plays a role as contributing to improvement in exhaust gas purification performance and heat resistance. Specific examples of a substance contained in the composite oxide other than the aluminum oxide includes lanthanum oxide ($La_2O_3$), cerium oxide ($CeO_2$, ceria), and zirconium oxide ($ZrO_2$, zirconia). Two or more kinds of composite oxides containing aluminum oxide may be used in combination. In some embodiments, a total amount of the composite oxide containing the aluminum oxide may be from 20 parts by mass to 80 parts by mass based on 100 parts by mass of the catalyst coating layer. In some embodiments, a total amount of the composite oxide containing the aluminum oxide may be from 25 parts by mass to 60 parts by mass based on 100 parts by mass of the catalyst coating layer.

The composite oxide containing the cerium oxide and the zirconium oxide is a material excellent in oxygen storage capacity. Specific examples of a substance contained in the composite oxide other than the cerium oxide or the zirconium oxide includes lanthanum oxide ($La_2O_3$), yttrium oxide ($Y_2O_3$, yttria), silicon oxide ($SiO_2$, silica), and neodymium oxide ($Nd_2O_3$). In some embodiments, an amount of the composite oxide containing the cerium oxide and the zirconium oxide may be from 20 parts by mass to 80 parts by mass based on 100 parts by mass of the catalyst coating layer. In some embodiments, an amount of the composite oxide containing the cerium oxide and the zirconium oxide may be from 40 parts by mass to 75 parts by mass based on 100 parts by mass of the catalyst coating layer.

Specific examples of the noble metal include platinum (Pt), palladium (Pd), rhodium (Rh), gold (Au), silver (Ag), iridium (Ir) and ruthenium (Ru). In some embodiments, at least one selected from the group consisting of Pt, Rh, Pd, Ir and Ru may be used among them in terms of catalyst performance. In some embodiments, at least one selected from the group consisting of Pt, Rh and Pd may be used among them in terms of catalyst performance.

The noble metal is supported on the peripheries of the voids and all carrier materials, such as the composite oxide containing the aluminum oxide and the composite oxide containing the cerium oxide and the zirconium oxide. Here, the peripheries of the voids mean surfaces of the voids contactable with an exhaust gas formed from a fibrous organic substance in the catalyst coating layer. The amount of the noble metal to be supported is not particularly limited, and an appropriate amount thereof may be supported depending on the intended design and the like. In some embodiments, the content of the noble metal may be 0.01 parts by mass to 10 parts by mass, in terms of metal, based on 100 parts by mass of the catalyst coating layer. In some embodiments, the content of the noble metal may be 0.01 parts by mass to 5 parts by mass, in terms of metal, based on 100 parts by mass of the catalyst coating layer. While too small an amount of the noble metal supported tends to result in an insufficient catalytic activity, and on the other hand, too large an amount thereof tends to cause saturation of catalytic activity and an increase in cost. Any amount in the above range does not cause such problems.

Regarding a support distribution of the noble metal, a supporting state to the material can be confirmed, for example, through observation of the catalyst coating layer with an Electron Probe Micro Analyzer (EPMA) and an elementary analysis. Additionally, the use of a Scanning Transmission Electron Microscope (STEM) allows confirmation of the supporting state around the surface of the void.

Since the noble metal is supported on the peripheries of the voids, the composite oxide containing the aluminum oxide, and the composite oxide containing the cerium oxide and the zirconium oxide, the heat resistance, an oxygen absorption/release capacity, and a gas contact rate of the noble metal itself can be improved and further both of the purification performance and an OSC performance, which may be incompatible to one another in the exhaust gas purification catalyst, can be improved. Accordingly, the exhaust gas purification catalyst including the catalyst coating layer of the present disclosure allows providing the sufficient purification performance with the small amount of the noble metal even under a high Ga condition and in a transient state where the A/F repeats rich and lean phases.

In some embodiments, the amount of coating of one layer of the catalyst coating layer may be in the range from 50 g/L to 300 g/L based on a unit volume of the substrate. Too small an amount of coating does not impart sufficient catalytic activity performance of the catalyst and thus does not impart sufficient catalyst performance such as NOx conversion performance. On the other hand, too large an amount thereof also increases pressure loss to cause fuel efficiency to be deteriorated. Any amount in the above range does not cause such problems. In some embodiments, the amount of coating of one layer of the catalyst coating layer may be in the range from 50 g/L to 250 g/L based on the unit volume of the substrate, in terms of a balance among pressure loss, catalyst performance and durability. In some embodiments, the amount of coating of one layer of the catalyst coating layer may be in the range from 50 g/L to 200 g/L, based on the unit volume of the substrate, in terms of a balance among pressure loss, catalyst performance and durability.

The thickness of one layer of the catalyst coating layer is in the range from 20 μm to 100 μm as the average thickness. Too thin a catalyst coating layer does not impart sufficient catalyst performance. On the other hand, too thick a catalyst coating layer increases the pressure loss in passing of exhaust gas and the like to fail to impart sufficient catalyst performance such as NOx conversion performance. Any thickness in the above range does not cause such problems. In some embodiments, the thickness may be in the range from 20.0 μm to 83.3 μm, in terms of a balance among pressure loss, catalyst performance and durability. In some embodiments, the thickness may be in the range from 20.0 μm to 66.7 μm, in terms of a balance among pressure loss, catalyst performance and durability. The "thickness" of the catalyst coating layer used herein means a length of the catalyst coating layer in a direction perpendicular to the center of a flat portion of the substrate, namely, the shortest distance between the surface of the catalyst coating layer and the surface of the substrate (an interface with the lower layer catalyst coating when the lower layer catalyst coating is present). The average thickness of the catalyst coating layer can be determined by, for example, observing the catalyst coating layer with a scanning electron microscope (SEM) or an optical microscope to measure the thickness at each of any 10 points or more, and calculating the average thickness.

While the catalyst coating layer is formed mainly from the noble metal, the composite oxide containing the aluminum oxide, and the composite oxide containing the cerium oxide and the zirconium oxide, the catalyst coating layer may also further comprise other component as long as the effect of the present disclosure is not impaired. Examples of such other component include other composite oxide containing aluminum oxide and an additive for use in a catalyst coating layer in such a kind of use, and specific examples include one or more of alkali metals such as potassium (K), sodium (Na), lithium (Li) and cesium (Cs), alkaline earth metals such as barium (Ba), calcium (Ca) and strontium (Sr), rare-earth elements such as lanthanum (La), yttrium (Y) and cerium (Ce), and transition metals such as iron (Fe).

A large number of voids are included in the catalyst coating layer, and the porosity thereof is in the range from 50% by volume to 80% by volume as measured by a weight-in-water method. Too low a porosity of the catalyst coating layer deteriorates gas diffusivity and thus does not impart sufficient catalyst performance. On the other hand, too high a porosity increases diffusivity to thereby increase a proportion of gas passing through the coating layer without coming in contact with a catalytic active site, not imparting sufficient catalyst performance. Any porosity in the above range does not cause such problems. In some embodiments, the porosity of the catalyst coating layer may be in the range from 50.9% by volume to 78.8% by volume, in terms of a balance between gas diffusivity and catalyst performance. In some embodiments, the porosity of the catalyst coating layer may be in the range from 54.0% by volume to 78.0% by volume, in terms of a balance between gas diffusivity and catalyst performance.

The "void(s)" in the catalyst coating layer means a space in the catalyst coating layer. The shape of the "void" is not particularly limited, and for example, may be any of spherical, elliptical, cylindrical, cuboid (rectangular column), disc, through-hole shapes, and shapes similar thereto. Such a void encompasses pores such as a micropore having an equivalent circle diameter of a cross-section, of less than 2 µm; a high-aspect-ratio pore having an equivalent circle diameter of a cross-section, of 2 µm or more, and having an aspect ratio of 5 or more; and a pore having an equivalent circle diameter of a cross-section, of 2 µm or more, and not having an aspect ratio of 5 or more. The porosity of the catalyst coating layer can be determined by, for example, subjecting an exhaust gas purification catalyst with only a catalyst coating layer to measurement by a weight-in-water method. Specifically, the porosity can be measured by, for example, a method according to a method prescribed in JIS R 2205.

In the exhaust gas purification catalyst of the present disclosure, the high-aspect-ratio pores having the aspect ratio of 5 or more account for 0.5% by volume to 50% by volume of the whole volume of voids in the catalyst coating layer. The high-aspect-ratio pore is characterized by having the equivalent circle diameter in the range from 2 µm to 50 µm in a cross-sectional image of a catalyst coating layer cross section perpendicular to an exhaust gas flow direction, and the average aspect ratio in the range from 10 to 50.

Accordingly, a pore having the equivalent circle diameter of less than 2 µm is not considered to be the high-aspect-ratio pore, even if having the aspect ratio of 5 or more.

Too low the average aspect ratio of the high-aspect-ratio pore does not impart sufficient pore connectivity. On the other hand, too high the average aspect ratio thereof causes too high a gas diffusivity and thus increases a proportion of gas passing through the coating layer without coming into contact with a catalytic active site, not imparting sufficient catalyst performance. Any average aspect ratio in the range from 10 to 50 does not cause such problems. In some embodiments, the average aspect ratio of the high-aspect-ratio pore may be in the range from 10 to 35, in view of compatibility of gas diffusivity with catalyst performance. In some embodiments, the average aspect ratio of the high-aspect-ratio pore may be in the range from 10 to 30, in view of compatibility of gas diffusivity with catalyst performance.

The average aspect ratio of the high-aspect-ratio pore in the catalyst coating layer can be measured by analyzing a cross-sectional image of a catalyst coating layer cross section perpendicular to an exhaust gas flow direction (axial direction of a honeycomb-shaped substrate) of the substrate, from the three-dimensional information on the pore of the catalyst coating layer, obtained by FIB-SEM (Focused Ion Beam-Scanning Electron Microscope), X-ray CT, or the like.

Specifically, for example, in the case of FIB-SEM analysis, first, a continuous cross-sectional image (SEM image) of a catalyst coating layer cross section perpendicular to an exhaust gas flow direction of the substrate is acquired by FIB-SEM analysis. Next, the resulting continuous cross-sectional image is analyzed, and three-dimensional information on a pore having an equivalent circle diameter of a cross-section, of 2 µm or more, is extracted. FIG. 1 illustrates a two-dimensional projection diagram exemplifying analysis results of three-dimensional information on the pore, obtained by analyzing a continuous cross-sectional image of a catalyst coating layer cross section perpendicular to an exhaust gas flow direction of the substrate of the exhaust gas purification catalyst, as one example of analysis results of three-dimensional information on the pore. As is clear from the analysis results of three-dimensional information on the pore shown in FIG. 1, the shape of the pore is indefinite, and a distance for connecting a starting point and an end point in the continuous cross-sectional image (SEM image) of the pore is defined as "longitudinal size". Herein, the starting point and the end point correspond to centroids in each SEM image. Next, a constriction portion in a path for connecting the starting point and the end point at the shortest distance in the continuous cross-sectional image (SEM image) of the pore is defined. The minimum part whose equivalent circle diameter is 2 µm or more and is also minimum among the constriction portions in the cross-sectional SEM image is defined as a "throat-shaped portion," and the equivalent circle diameter thereof in the cross-sectional SEM image is defined as a "throat-shaped portion size". (while a plurality of constriction portions may be present in a pore, the throat-shaped portion size for calculating the aspect ratio is defined as follows: the minimum constriction portion is selected in the path for connecting the starting point and the end point at the shortest distance, and the equivalent circle diameter of the pore in the cross-sectional SEM image of the minimum constriction portion (throat-shaped portion) is defined as the "throat-shaped portion size".) Furthermore, the aspect ratio of the pore is defined as a "longitudinal size/throat-shaped portion size".

Figure 2:
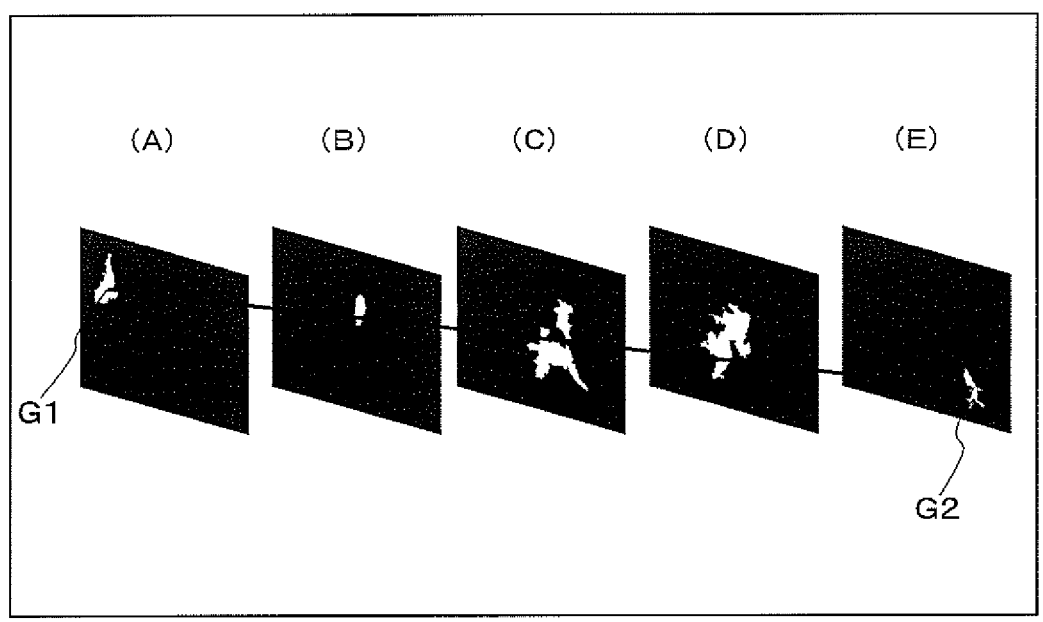
FIG. 2 is a schematic diagram illustrating the pore in the catalyst coating layer cross section at each of A to E in FIG. 1.

Next, FIG. 2 illustrates cross-sectional images (SEM images) of (A) (starting point of pore), (B) (throat-shaped portion of pore), (C) (medium point of longitudinal size of pore), (D) (maximum diameter portion having maximum equivalent circle diameter of pore), and (E) (end point of pore) in FIG. 1. FIG. 2 is a schematic diagram of a cross-sectional image (SEM image) of the pore in the catalyst coating layer cross section in (A) to (E) of FIG. 1. FIG. 2(A) is a schematic diagram of a cross-sectional image of the pore at the starting point (one end portion where the equivalent circle diameter of the pore is 2 μm or more) in the two-dimensional projection diagram of the pore illustrated in FIG. 1, and G1 represents centroid of the pore in the cross-sectional image. FIG. 2(B) is a schematic diagram of the cross-sectional image of the pore in the throat-shaped portion (which has an equivalent circle diameter of the pore of 2 μm or more and is the minimum constriction portion in the path for connecting the starting point and the end point at the shortest distance) in the two-dimensional projection diagram of the pore illustrated in FIG. 1. FIG. 2(C) is a schematic diagram of the cross-sectional image of the pore at the medium point in the path for connecting the starting point and the end point of the longitudinal size at the shortest distance in the two-dimensional projection diagram of the pore illustrated in FIG. 1. FIG. 2(D) is a cross-sectional image of the pore at a position where the equivalent circle diameter of the pore is maximum in the path for connecting the starting point and the end point of the longitudinal size at the shortest distance in the two-dimensional projection diagram of the pore illustrated in FIG. 1. FIG. 2(E) is a schematic diagram of a cross-sectional image of the pore at the end point (other end portion where the equivalent circle diameter of the pore is 2 μm or more) in the two-dimensional projection diagram of the pore illustrated in FIG. 1, and G2 represents centroid of the pore in the cross-sectional image. Here, the linear distance for connecting the starting point (G1 in FIG. 2(A)) of the pore and the end point (G2 in FIG. 2(E)) of the pore in FIG. 2 is defined as the "longitudinal size". In addition, a portion where the equivalent circle diameter in the cross-sectional SEM image is 2 μm or more and is minimum, among the constriction portions in the path for connecting the starting point and the end point of the pore at the shortest distance, is defined as a "throat-shaped portion", and the equivalent circle diameter thereof in the cross-sectional SEM image is defined as a "throat-shaped portion size". The aspect ratio of the pore is defined as a "longitudinal size/throat-shaped portion size". Furthermore, the "average aspect ratio of the high-aspect-ratio pore in the catalyst coating layer" can be determined as follows: aspect ratios of pores are determined in an area of 500 μm or more in the horizontal direction to the substrate flat portion of the catalyst coating layer, 25 μm or more in the perpendicular direction and 1000 μm or more in the axial direction to the substrate flat portion, or any area corresponding thereto; and the average aspect ratio of the high-aspect-ratio pore having an aspect ratio of 5 or more among the pores determined is calculated.

As described above, the rate of the high-aspect-ratio pores relative to the whole volume of voids in the catalyst coating layer is in the range from 0.5% by volume to 50% by volume. Too low a rate thereof causes poor pore connectivity. On the other hand, too high a rate thereof causes insufficient gas diffusivity in a direction perpendicular to an exhaust gas flow direction, not imparting sufficient catalyst performance and also causing peeling or the like due to reduction in strength of the catalyst coating layer. Any rate in the above range does not cause such problems. In some embodiments, the rate of the high-aspect-ratio pore relative to the whole volume of voids may be in the range from 0.6% by volume to 40.9% by volume, in terms of a balance among gas diffusivity, catalyst performance, and strength of the catalyst coating layer. In some embodiments, the rate of the high-aspect-ratio pore relative to the whole volume of voids may be in the range from 1% by volume to 30.1% by volume, in terms of a balance among gas diffusivity, catalyst performance, and strength of the catalyst coating layer.

The rate of the high-aspect-ratio pore relative to the whole volume of voids in the catalyst coating layer can be determined by dividing the porosity of the high-aspect-ratio pore (in an area of 500 μm or more in the horizontal direction to the substrate flat portion of the catalyst coating layer, 25 μm or more in the perpendicular direction to the substrate flat portion, and 1000 μm or more in the axial direction to the substrate flat portion, or any area corresponding thereto) by the porosity of the catalyst coating layer as measured by a weight-in-water method.

Furthermore, in the catalyst coating layer, the high-aspect-ratio pore may be oriented such that an 80% cumulative angle, in a cumulative angle distribution on an angle basis, of an angle (cone angle) between a vector in a longitudinal direction of the high-aspect-ratio pore and a vector in an exhaust gas flow direction of the substrate is in a range from 0 degree to 45 degrees in some embodiments. Thus, the gas diffusivity in an exhaust gas flow direction (axial direction of a honeycomb-shaped substrate) can be particularly enhanced to thereby enhance the efficiency of utilization of an active site. Too large an 80% cumulative angle tends to cause an insufficient component in the axial direction of the gas diffusivity, reducing the efficiency of utilization of an active site. Any angle in the above range does not cause such problems. In some embodiments, the 80% cumulative angle may be in the range from 15 degrees to 45 degrees, in terms of catalyst performance. In some embodiments, the 80% cumulative angle may be in the range from 30 degrees to 45 degrees, in terms of catalyst performance.

Figure 3:
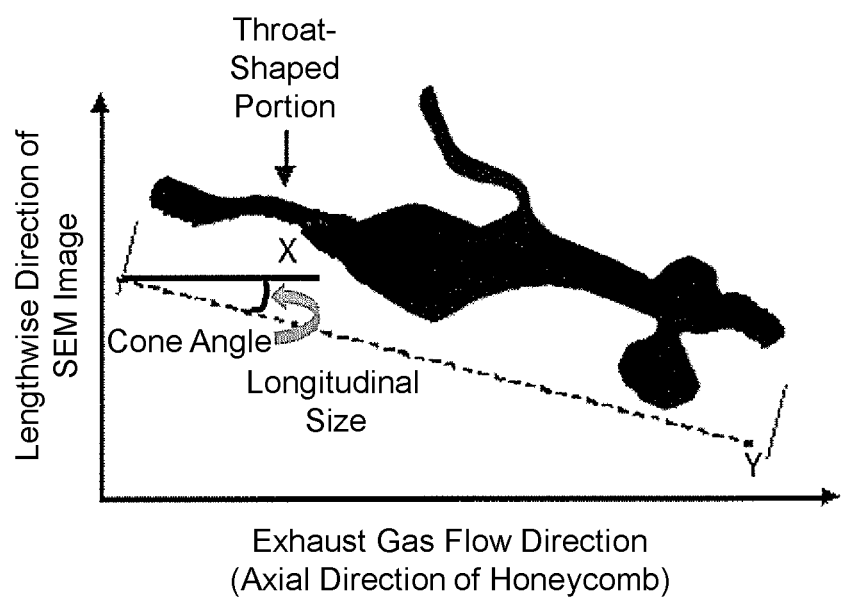
FIG. 3 is a schematic diagram illustrating a cone angle of the high-aspect-ratio pore in the two-dimensional projection diagram of FIG. 1.

The cone angle (orientation angle) of the high-aspect-ratio pore in the catalyst coating layer can be measured by analyzing the cross-sectional image of a catalyst coating layer cross section perpendicular to an exhaust gas flow direction (axial direction of a honeycomb-shaped substrate) of the substrate from the three-dimensional information on the pore of the catalyst coating layer. Specifically, for example, in the case of FIB-SEM analysis, the "cone angle" can be determined from an angle between a vector in a longitudinal direction resulting from the "longitudinal size" of the high-aspect-ratio pore obtained as above and a vector in an exhaust gas flow direction of the substrate. FIG. 3 is a schematic diagram illustrating a cone angle (orientation angle) of the high-aspect-ratio pore, and also illustrating one example of a method for determining the "cone angle". FIG. 3 illustrates a vector (Y) in a longitudinal direction of the high-aspect-ratio pore and a vector (X) in an exhaust gas flow direction of the substrate in the two-dimensional projection diagram in FIG. 1, and an angle between the vector (Y) in the longitudinal direction and the vector (X) in an exhaust gas flow direction of the substrate is defined as the "cone angle". The three-dimensional information on the pore (three-dimensional image) can be subjected to image analysis, to thereby calculate the 80% cumulative angle, in a cumulative angle distribution on an angle basis, of the cone angle. Herein, the 80% cumulative angle, in a cumulative angle distribution on an angle basis, of the cone angle of the high-aspect-ratio pore means a cone angle of the aspect-ratio pore which corresponds to the cone angle at 80% in terms of frequency (a cumulative frequency of 80%, on an angle basis of the cone angle) relative to the total number of the high-aspect-ratio pores when the number of the high-aspect-ratio pores is counted from the high-aspect-ratio pore having the smallest cone angle (degrees) in the ascending order. Herein, the 80% cumulative angle, in a cumulative angle distribution on an angle basis, of the cone angle of the high-aspect-ratio pore can be determined by randomly extracting 20 or more of the high-aspect-ratio pores, and determining the 80% cumulative angle, in a cumulative angle distribution on an angle basis, of the cone angle of each of the high-aspect-ratio pores to provide an average value.

Figure 4:
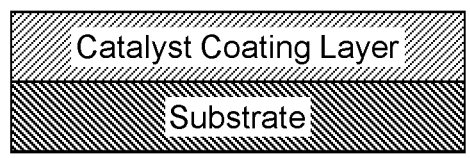
FIG. 4 is a diagram schematically illustrating an example of a structure of the exhaust gas purification catalyst of the present disclosure.

FIG. 4 schematically illustrates an example of a structure of the exhaust gas purification catalyst of the present disclosure. In FIG. 4, the catalyst coating layer containing the noble metal, the composite oxide containing the aluminum oxide, and the composite oxide containing the cerium oxide and the zirconium oxide is coated on the substrate. The catalyst coating layer has the high-aspect-ratio pores at a certain rate. The noble metal is supported on the peripheries of the voids and all carrier materials, such as the composite oxide containing the aluminum oxide and the composite oxide containing the cerium oxide and the zirconium oxide.

(Embodiments of Use of Exhaust Gas Purification Catalyst)

The exhaust gas purification catalyst of the present disclosure may be used singly or in combination with other catalyst. Such other catalyst is not particularly limited, and a known catalyst (for example, in the case of an exhaust gas purification catalyst for automotives, an oxidation catalyst, a NOx reduction catalyst, a NOx storage reduction catalyst (NSR catalyst), a lean NOx trap catalyst (LNT catalyst), a NOx selective reduction catalyst (SCR catalyst), or the like) may be appropriately used.

[Method for Producing Exhaust Gas Purification Catalyst]

The method for producing an exhaust gas purification catalyst of the present invention, in which the exhaust gas purification catalyst has on a substrate a catalyst coating layer including a novel metal, a composite oxide containing aluminum oxide, and a composite oxide containing cerium oxide and zirconium oxide, includes the steps of forming a catalyst coating layer using a catalyst slurry including a noble metal raw material having catalyst activity, composite oxide particles containing aluminum oxide, composite oxide particles containing cerium oxide and zirconium oxide, and a fibrous organic substance in an amount of 0.5 parts by mass to 9.0 parts by mass based on 100 parts by mass of the composite oxide particles containing the aluminum oxide and the composite oxide particles containing the cerium oxide and the zirconium oxide. The fibrous organic substance has an average fiber diameter in a range from 1.7 μm to 8.0 μm and an average aspect ratio in a range from 9 to 40. When coating the substrate with the catalyst slurry and then heating the catalyst slurry, at least a part of the fibrous organic substance may be removed to form voids in the catalyst coating layer. Herein, in a case where the catalyst coating layer is configured from two or more layers, the lower catalyst coating layer(s) located lower with respect to the uppermost catalyst coating layer, in the catalyst coating layers, can be formed by a conventionally known method, for example, using a catalyst slurry containing a novel metal, composite oxide containing aluminum oxide, and composite oxide containing cerium oxide and zirconium oxide and containing no fibrous organic substance.

(Composite Oxide Particles Containing Aluminum Oxide and Composite Oxide Particles Containing Cerium Oxide and Zirconium Oxide)

The composite oxide particles containing the aluminum oxide and the composite oxide particles containing the cerium oxide and the zirconium oxide are the same as described above with respect to the composite oxide containing the aluminum oxide and the composite oxide containing the cerium oxide and the zirconium oxide contained in the catalyst coating layer of the exhaust gas purification catalyst of the present disclosure. A preparation method of the composite oxide particles containing the aluminum oxide and the composite oxide particles containing the cerium oxide and the zirconium oxide is not particularly limited, and a known method can be appropriately adopted. As the composite oxide particles containing the aluminum oxide and the composite oxide particles containing the cerium oxide and the zirconium oxide, a commercially available product may also be used. Examples of the composite oxide particles containing the aluminum oxide and the composite oxide particles containing the cerium oxide and the zirconium oxide for use in the method of the present disclosure include one prepared by a known method and/or commercially available one, or a dispersion liquid obtained by dispersing these substances into, for example, a solvent, such as ion exchanged water.

A particle size of the composite oxide particles containing the aluminum oxide is not limited. In some embodiments, a particle size of the composite oxide particles containing the aluminum oxide may be from 0.1 μm to 10 μm by a value of a 50% cumulative size in a cumulative particle size distribution on a volume basis. In some embodiments, a particle size of the composite oxide particles containing the aluminum oxide may be from 1 μm to 8 μm by a value of a 50% cumulative size in a cumulative particle size distribution on a volume basis.

A particle size of the composite oxide particles containing the cerium oxide and the zirconium oxide is not limited. In some embodiments, a particle size of the composite oxide particles containing the cerium oxide and the zirconium oxide may be from 0.1 μm to 10 μm by a value of a 50% cumulative size in a cumulative particle size distribution on a volume basis. In some embodiments, a particle size of the composite oxide particles containing the cerium oxide and the zirconium oxide may be from 3 μm to 8 μm by a value of a 50% cumulative size in a cumulative particle size distribution on a volume basis.

(Preparation and Coating of Catalyst Slurry)

In the method for producing the exhaust gas purification catalyst of the present disclosure, the catalyst slurry is used, and the catalyst slurry contains the novel metal raw material, the composite oxide particles containing the aluminum oxide, the composite oxide particles containing the cerium oxide and the zirconium oxide and the fibrous organic substance in an amount of 0.5 parts by mass to 9.0 parts by mass based on 100 parts by mass of the composite oxide particles containing the aluminum oxide and the composite oxide particles containing the cerium oxide and the zirconium oxide.

While the solvent is not specifically limited, an example of the solvent includes water (in some embodiments, pure water, such as ion exchanged water and distilled water, may be used).

The noble metal raw material for preparation of the noble metal particles is not particularly limited, and examples thereof include a solution obtained by dissolving a salt (for example, acetate, carbonate, nitrate, an ammonium salt, citrate, or a dinitrodiammine salt) of a noble metal (for example, Pt, Rh, Pd or Ru, or a compound thereof), or a complex thereof (for example, a tetraammine complex) in a solvent such as water or alcohol. In addition, the amount of the noble metal is not particularly limited, the noble metal may be appropriately supported in a required amount depending on the intended design and the like. In some embodiments, the amount may be 0.01% by mass or more. Herein, when platinum is used as the noble metal, a platinum salt is not particularly limited, and examples thereof include acetate, carbonate, nitrate, an ammonium salt, citrate or a dinitrodiammine salt of platinum (Pt), or a complex thereof. In some embodiments, a dinitrodiammine salt may be used among them because it is easily supported and has a high dispersibility. When palladium is used as the noble metal, a palladium salt is not particularly limited, and examples thereof include a solution of acetate, carbonate, nitrate, an ammonium salt, citrate, a dinitrodiammine salt of palladium (Pd), or a complex thereof. In some embodiments, nitrate or a dinitrodiammine salt may be used among them because it is easily supported and has a high dispersibility. When rhodium is used as the noble metal, a rhodium salt is not particularly limited, and examples thereof include a solution of acetate, carbonate, nitrate, an ammonium salt, citrate, a dinitrodiammine salt of rhodium (Rh), or a complex thereof. In some embodiments, nitrate or a dinitrodiammine salt may be used among them because it is easily supported and has a high dispersibility. Furthermore, the solvent is not particularly limited, and examples thereof include a solvent that can allow dissolution in the form of an ion, such as water (in some embodiments, pure water, such as ion-exchange water and distilled water, may be used).

The fibrous organic substance is not particularly limited as long as it is a substance that can be removed by a heating step described below, and examples thereof include a polyethylene terephthalate (PET) fiber, an acrylic fiber, a nylon fiber, a rayon fiber, and a cellulose fiber. In some embodiments, at least one selected from the group consisting of a PET fiber and a nylon fiber may be used among them in terms of a balance between processability and the firing temperature. By using a catalyst slurry containing such a fibrous organic substance and at least partially removing the fibrous organic substance in a subsequent step, voids having the same shape as that of the fibrous organic substance can be formed in the catalyst coating layer. The voids thus formed can serve as a diffusion path of exhaust gas and the resulting catalyst can exhibit excellent catalyst performance even in a region under a high load with a high flow rate of gas.

The fibrous organic substance for use in the catalyst production method of the present disclosure has an average fiber diameter in the range from 1.7 µm to 8.0 µm. Too small an average fiber diameter does not impart an effective high-aspect-ratio pore, resulting in insufficient catalyst performance. On the other hand, too large an average fiber diameter increases the thickness of the catalyst coating layer, thereby increasing pressure loss to cause deterioration in fuel efficiency. Any average fiber diameter in the above range does not cause such problems. In some embodiments, the average fiber diameter of the fibrous organic substance may be in the range from 2.0 µm to 6.0 µm, in terms of a balance between catalyst performance and coating thickness. In some embodiments, the average fiber diameter of the fibrous organic substance may be in the range from 2.0 µm to 5.0 µm, in terms of a balance between catalyst performance and coating thickness.

The fibrous organic substance for use in the catalyst production method of the present disclosure has an average aspect ratio in the range from 9 to 40. Too low an average aspect ratio results in insufficient pore connectivity to thereby cause gas diffusivity to be insufficient. On the other hand, too high an average aspect ratio causes too high a diffusivity to thereby increase a proportion of gas passing through the coating layer without coming into contact with a catalytic active site, not imparting sufficient catalyst performance. Any average aspect ratio in the above range does not cause such problems. In some embodiments, the average aspect ratio of the fibrous organic substance may be in the range from 9 to 30, in terms of a balance between gas diffusivity and catalyst performance. In some embodiments, the average aspect ratio of the fibrous organic substance may be in the range from 9 to 28, in terms of a balance between gas diffusivity and catalyst performance. Herein, the average aspect ratio of the fibrous organic substance is defined as an "average fiber length/average fiber diameter". Herein, the fiber length means the linear distance for connecting the starting point and the end point of the fiber. The average fiber length can be determined by randomly extracting 50 or more of the fibrous organic substances, measuring the fiber length of each of the fibrous organic substances, and calculating an average value. In addition, the average fiber diameter can be determined by randomly extracting 50 or more of the fibrous organic substances, measuring the fiber diameter of each of the fibrous organic substances, and calculating an average value.

In the catalyst production method of the present disclosure, the fibrous organic substance is used in an amount of 0.5 parts by mass to 9.0 parts by mass based on 100 parts by mass of the composite oxide particles containing the aluminum oxide and the composite oxide particles containing the cerium oxide and the zirconium oxide in a catalyst slurry for formation of the catalyst coating layer. Too small an amount of the fibrous organic substance mixed fails to impart sufficient pore connectivity, resulting in insufficient catalyst performance. On the other hand, too large an amount thereof increases the thickness of the catalyst coating layer, thereby increasing pressure loss to cause deterioration in fuel efficiency. Any amount in the above range does not cause such problems. In some embodiments, the fibrous organic substance may be used in an amount of 0.5 parts by mass to 8.0 parts by mass based on 100 parts by mass of the composite oxide particles containing the aluminum oxide and the composite oxide particles containing the cerium oxide and the zirconium oxide in the catalyst slurry, in terms of a balance between catalyst performance and pressure loss. In some embodiments, the fibrous organic substance may be 0.5 parts by mass to 5.0 parts by mass based on 100 parts by mass of the composite oxide particles containing the aluminum oxide and the composite oxide particles containing the cerium oxide and the zirconium oxide in the catalyst slurry, in terms of a balance between catalyst performance and pressure loss. In some embodiments, the fibrous organic substance may have an average fiber diameter in the range from 2.0 µm to 6.0 µm and an average aspect ratio in the range from 9 to 30.

The method for preparing the catalyst slurry is not particularly limited. The noble metal raw material, the composite oxide particles containing the aluminum oxide, the composite oxide particles containing the cerium oxide and the zirconium oxide, and the fibrous organic substance may be mixed, if necessary with a known binder or the like, and a known method can be appropriately adopted A condition for the mixture is not specifically limited. Herein, conditions of such mixing are not particularly limited. In some embodiments, the stirring speed and the treatment time may be in the range from, for example, 100 rpm to 400 rpm and 30 minutes or more, respectively, and the materials may be uniformly dispersed and mixed in the catalyst slurry. Additionally, the following method may be used. Since the noble metal is supported on all materials, the mixture is performed in the order of the composite oxide particles containing the cerium oxide and the zirconium oxide, the composite oxide particles containing the aluminum oxide, and the fibrous organic substance into a solution containing the noble metal raw material, and the resultant solution is stirred after each mixture. Treatment conditions are not particularly limited, and are appropriately selected depending on the design of the intended exhaust gas purification catalyst or the like.

In some embodiments, the surface of the substrate, or optionally the lower catalyst coating layer on the substrate may be coated with the catalyst slurry containing the novel metal raw material, the composite oxide particles containing the aluminum oxide, the composite oxide particles containing the cerium oxide and the zirconium oxide and the fibrous organic substance to thereby form a catalyst slurry layer such that the amount of coating of the catalyst coating layer after firing may be in a range from 50 g/L to 300 g/L based on the unit volume of the substrate and that the average thickness of the catalyst coating layer after firing may be in the range from 20 μm to 100 μm. The coating method is not particularly limited, and a known method can be appropriately adopted. Specific examples include a method where a honeycomb-shaped substrate is dipped in to coat the substrate with the catalyst slurry (dipping method), a wash coat method, and a method where the catalyst slurry is injected by an injection means. Herein, the surface of the honeycomb-shaped substrate is needed to be coated with the catalyst slurry under coating conditions such that the following are satisfied: the amount of coating of the catalyst coating layer after firing is in the range from 50 g/L to 300 g/L based on the unit volume of the substrate, and the average thickness of the catalyst coating layer after firing is in the range from 20 μm to 100 μm.

In the catalyst production method of the present disclosure, the substrate is coated with the catalyst slurry, and then heated to thereby evaporate the solvent or the like included in the slurry and also remove the fibrous organic substance. Such heating is typically conducted by firing the substrate coated with the catalyst slurry. In some embodiments, such firing may be conducted at a temperature in the range from 300 to 800° C. In some embodiments, such firing may be conducted at a temperature in the range from 400 to 700° C. Too low a firing temperature tends to cause the fibrous organic substance to remain, and on the other hand, too high a firing temperature tends to sinter the particle. Any firing temperature in the above range does not cause such problems. The firing time varies depending on the firing temperature. In some embodiments, the firing time may be 20 minutes or more. In some embodiments, the firing time may be 30 minutes to 2 hours. Furthermore, the atmosphere in firing is not particularly limited. In some embodiments, the atmosphere in firing may be in the air or in an atmosphere of inert gas such as nitrogen ($N_2$).

The exhaust gas purification catalyst including two or more catalyst coating layers can be prepared by coating the substrate with the catalyst slurry and heating it to thereby form the catalyst coating layer on the substrate, and coating again the resultant with a catalyst slurry optionally different therefrom in composition, namely, the amounts and the types of the composite oxide containing the aluminum oxide, the composite oxide containing the cerium oxide and the zirconium oxide, the noble metal and the like, and heating it, in a repeated manner. The exhaust gas purification catalyst including two or more catalyst coating layers can be prepared by using a catalyst slurry including noble metal particles, composite oxide particles containing cerium oxide and zirconium oxide, and composite oxide particles containing aluminum oxide to form a lower catalyst coating layer, and then using a catalyst slurry including noble metal particles, composite oxide particles containing aluminum oxide, composite oxide particles containing cerium oxide and zirconium oxide, and a fibrous organic substance to form an uppermost catalyst coating layer thereon.

The exhaust gas purification catalyst of the present disclosure is used for a method for purifying exhaust gas where exhaust gas discharged from an internal combustion engine is brought into contact with the catalyst. The method for bringing exhaust gas into contact with the exhaust gas purification catalyst is not particularly limited, and a known method can be appropriately adopted. For example, a method may be adopted where the exhaust gas purification catalyst according to the present disclosure is disposed in an exhaust gas tube through which gas discharged from an internal combustion engine flows, thereby bringing exhaust gas discharged from an internal combustion engine into contact with the exhaust gas purification catalyst.

The exhaust gas purification catalyst of the present disclosure exhibits excellent catalyst performance even in a region under a high load with a high flow rate of gas. Therefore, for example, when exhaust gas discharged from an internal combustion engine of an automotive or the like is brought into contact with the exhaust gas purification catalyst of the present disclosure, exhaust gas can be purified even in a region under a high load with a high flow rate of gas. The exhaust gas purification catalyst of the present disclosure can be used for purifying harmful components such as harmful gases (hydrocarbon (HC), carbon monoxide (CO), nitrogen oxides (NOx)) in exhaust gas discharged from an internal combustion engine of an automotive or the like.

EXAMPLES

While the following describes the present disclosure in further detail using the examples, the present disclosure is not limited to these examples.

I. Preparation of Catalyst

I-1. Used Materials

Material 1 ($Al_2O_3$)
  4% by mass-$La_2O_3$ composite $Al_2O_3$

Material 2 (ZC)
  21% by mass-$CeO_2$, 72% by mass-$ZrO_2$, 1.7% by mass-$La_2O_3$, 5.3% by mass-$Y_2O_3$ composite oxide Material 3 (Rh)
  Nitric acid Rh Material 4 (Fibrous Organic Substance)
  Organic fiber Material 5 (Rh/$Al_2O_3$)
  Material in which nitric acid Rh is supported on the material 1

Material 6 (Rh/ZC)
  Material in which nitric acid Rh is supported on the material 2

Material 7 (Rh/Fibrous Organic Substance)
  Material in which nitric acid Rh is supported on the material 4

Substrate

Cordierite honeycomb substrate with 875 cc (400 cells: square, wall thickness of 4 mil)

I-2. Preparation of Catalyst

Example 1

First, the material 3 was introduced into distilled water while stirred such that an amount of Rh became 0.45 g per liter of the volume of the substrate (0.45 g/L), and subsequently the material 2 was introduced and stirred for about 10 minutes. Next, the material 1 and $Al_2O_3$-based binder were introduced and the material 4 was introduced after stirring for about 10 minutes and stirred for about 10 minutes to prepare a suspended slurry 1.

Next, the prepared slurry 1 was poured into the substrate and unnecessary content was blown off with a blower to coat the material on a wall surface of the substrate. At that time, the material 1 was adjusted so as to be 50 g per liter of the volume of the substrate (50 g/L), and the material 2 was adjusted so as to be 30 g per liter of the volume of the substrate (30 g/L). After the coating by 100% to the overall length of the substrate, water was removed for two hours by a dryer held at 120° C., and the substrate was fired for two hours by an electric furnace held at 500° C. to prepare a catalyst coating layer.

Comparative Example 1

Except that the material 6 was used instead of using the material 3 and the material 2, a catalyst coating layer was prepared similarly to Example 1.

Comparative Example 2

Except that the material 5 was used instead of using the material 3 and the material 1, a catalyst coating layer was prepared similarly to Example 1.

Comparative Example 3

Except that the material 7 was used instead of using the material 3 and the material 4, a catalyst coating layer was prepared similarly to Example 1.

Comparative Example 4

Except that the material 4 was not used, a catalyst coating layer was prepared similarly to Example 1.

Table 1 summarizes catalyst structures of exhaust gas purification catalysts of Example 1 and Comparative Examples 1 to 4.

TABLE 1

List of standard for preparation of example and comparative examples

| | | Slurry | | Amount of noble metal g/L |
|---|---|---|---|---|
| Example 1 | Material 1 | $Al_2O_3$ | 50 g/L | Rh 0.45 |
| | Material 2 | ZC | 30 g/L | |
| | Material 4 | Organic fiber | 3 mass % | — |
| Comparative Example 1 | Material 1 | $Al_2O_3$ | 50 g/L | — |
| | Material 6 | Rh/ZC | 30 g/L | Rh 0.45 |
| | Material 4 | Organic fiber | 3 mass % | — |

TABLE 1-continued

List of standard for preparation of example and comparative examples

| | | Slurry | | Amount of noble metal g/L |
|---|---|---|---|---|
| Comparative Example 2 | Material 5 | $Rh/Al_2O_3$ | 50 g/L | Rh 0.45 |
| | Material 2 | ZC | 30 g/L | — |
| | Material 4 | Organic fiber | 3 mass % | — |
| Comparative Example 3 | Material 1 | $Al_2O_3$ | 50 g/L | — |
| | Material 5 | ZC | 30 g/L | — |
| | Material 7 | Rh/Organic fiber | 3 mass % | Rh 0.45 |
| Comparative Example 4 | Material 1 | $Al_2O_3$ | 50 g/L | Rh 0.45 |
| | Material 2 | ZC | 30 g/L | |
| | Material 4 | Organic fiber | None | — |

II. Evaluation on Catalyst

First, using the actual engine, the following durability test was conducted on the exhaust gas purification catalysts of Example 1 and Comparative Examples 1 to 4.

The durability test was conducted as follows. The exhaust gas purification catalysts were each mounted to an exhaust system of a V-type eight-cylinder engine, exhaust gases under respective stoichiometric and lean atmospheres were repeatedly flown by a certain period of time (a ratio of 3:1) at a catalyst bed temperature of 900° C. for 50 hours.

Subsequently, the following performance evaluation was conducted on the exhaust gas purification catalysts of Example 1 and Comparative Examples 1 to 4 on which the durability test had been conducted.

(NOx Conversion Test)

The exhaust gas purification catalysts were each mounted to an exhaust system of an L-type four-cylinder engine, exhaust gases with Ga=30 g/s and air-fuel ratios (A/F) of 14.1 and 15.1 were supplied in alternation at a catalyst bed temperature of 550° C., and NOx conversion efficiency was evaluated to calculate an average value.

(OSC Performance Test)

An oxygen absorption/release capacity of each exhaust gas purification catalyst during the active A/F (the rich and lean phases are repeated in a short period) was measured to measure an OSC performance. In the OSC performance test, the larger the value is, the more an A/F variation of an engine output gas can be absorbed, an atmosphere inside the catalyst was maintained to around a stoichiometric state, and a high purification ability can be maintained.

Figure 5:
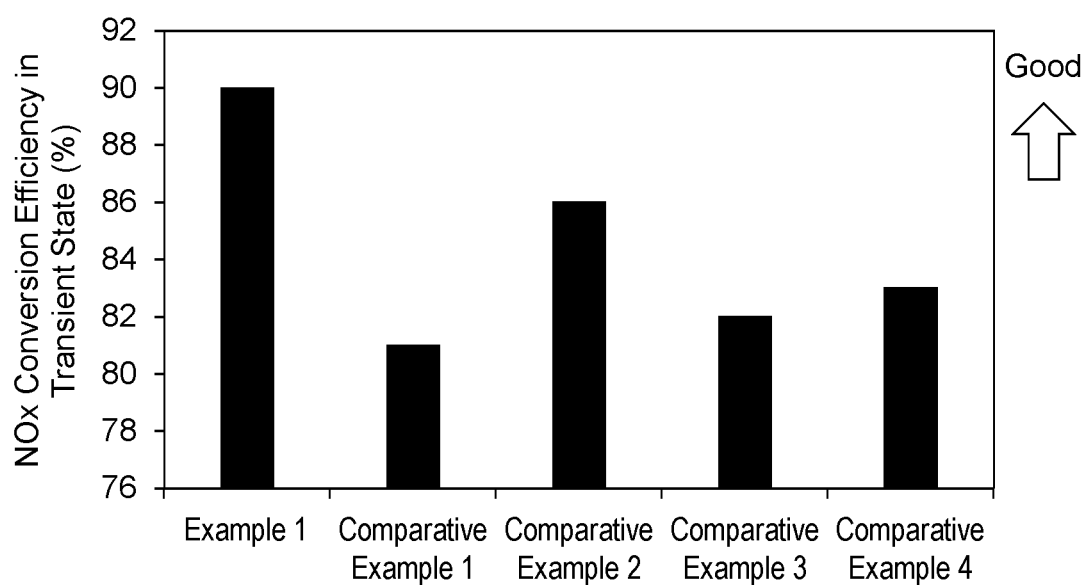
FIG. 5 is a diagram illustrating NOx conversion performances under a rich atmosphere in exhaust gas purification catalysts of Example 1 and Comparative Examples 1 to 4.
Figure 6:
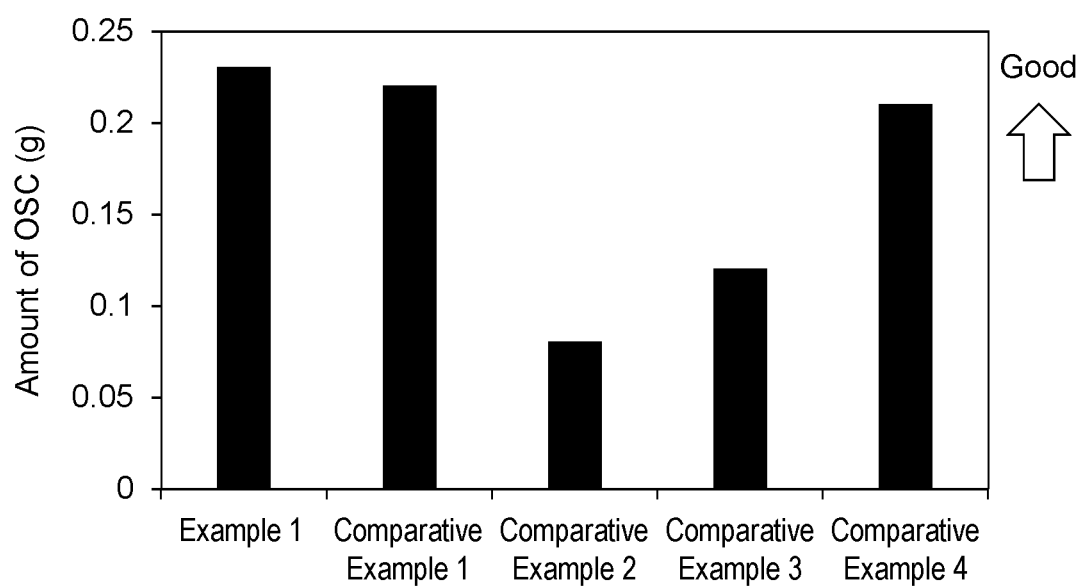
FIG. 6 is a diagram illustrating a OSC performance in the exhaust gas purification catalysts of Example 1 and Comparative Examples 1 to 4.

Table 2 summarizes Rh locations of the exhaust gas purification catalysts of Example 1 and Comparative Examples 1 to 4. Further, FIG. 5 illustrates results of the NOx conversion efficiency under rich atmosphere, and FIG. 6 illustrates results of the OSC performance.

TABLE 2

List of Example and Comparative Examples (catalyst structure)

| | Rh location |
|---|---|
| Example 1 | Supported on voids, an OSC material, and an alumina material |
| Comparative Example 1 | Supported on an OSC material |
| Comparative Example 2 | Supported on an alumina material |
| Comparative Example 3 | Supported on voids |
| Comparative Example 4 | Supported on an OSC material and an alumina material (No voids) |

Example 1 exhibited performances higher than those of Comparative Examples in both of the NOx conversion efficiency and the OSC performance. Meanwhile, as in Comparative Example 1, in the case where the noble metal was supported on only the ZC, which was the composite oxide containing the cerium oxide and the zirconium oxide, the purification performance was degraded, and as in Comparative Example 2, in the case where the noble metal was supported on only the alumina, which was the composite oxide containing the aluminum oxide, the OSC performance was degraded. As a result, both performances could not be improved. It is considered that these occurred because of the following reasons. To improve an activation of the noble metal itself, the noble metal needs to be supported on the alumina with high heat resistance. However, the noble metal has a role of improving an OSC function to absorb and detach oxygen, and to maximally provide the OSC performance, the noble metal needs to be supported on the ZC, which is the composite oxide containing the cerium oxide and the zirconium oxide.

As described in Comparative Example 3, in the case where the noble metal was supported on only the voids, compared with Example 1, both of the NOx conversion efficiency and the OSC performance were degraded. It is considered that this occurred due to failing to effectively use the functions of the alumina and the ZC when the noble metal is supported on only the voids. In addition, in a case where the voids are not controlled as in Comparative Example 4, specifically the NOx conversion efficiency is degraded. Controlling the voids allows enhancing gas diffusivity, thereby ensuring improving reactivity.

The following has been found from these results. It is important that the noble metal is not supported on only any of the alumina as the composite oxide containing the aluminum oxide with the satisfactory NOx conversion efficiency, the ZC as the composite oxide containing the cerium oxide and the zirconium oxide with the satisfactory OSC performance, and the voids with the satisfactory gas diffusion, but is supported on all of the alumina and the ZC including the voids that have been controlled as in Example.

Additionally, when the thickness of the coating layer is extremely thin or extremely thick, an effect brought by void control decreases. The extremely thick thickness causes incompatibility, such as low adhesiveness of the coating layer. Accordingly, as the results of extensive studies, the thickness of the coating layer where the present disclosure works the most effective was 20 μm to 100 μm in the direction perpendicular to the gas flow direction.

All documents, patents and patent publications cited in the present description are herein incorporated by reference as they are.

The invention claimed is:

1. An exhaust gas purification catalyst comprising a catalyst coating layer on a substrate, the catalyst coating layer containing a noble metal, a composite oxide containing cerium oxide and zirconium oxide, and a composite oxide containing aluminum oxide,
  wherein in the catalyst coating layer:
    an average thickness of the coating layer is in a range from 20 μm to 100 μm;
    a porosity measured by a weight-in-water method is in a range from 50% by volume to 80% by volume; and
    high-aspect-ratio pores having an aspect ratio of 5 or more account for 0.5% by volume to 50% by volume of a whole volume of voids, the high-aspect-ratio pores having an equivalent circle diameter in a range from 2 μm to 50 μm in a cross-sectional image of a catalyst coating layer cross section perpendicular to an exhaust gas flow direction of the substrate and having an average aspect ratio in a range from 10 to 50, and
  wherein the noble metal is supported on peripheries of the voids, the composite oxide containing the cerium oxide and the zirconium oxide, and the composite oxide containing the aluminum oxide.

2. The exhaust gas purification catalyst according to claim 1,
  wherein in the catalyst coating layer, the high-aspect-ratio pores are oriented such that a value of an 80% cumulative angle, in a cumulative angle distribution on an angle basis, of an angle cone angle between a vector in a longitudinal direction of the high-aspect-ratio pore and a vector in the exhaust gas flow direction of the substrate is in a range from 0 to 45 degrees.

3. The exhaust gas purification catalyst according to claim 1,
  wherein in the catalyst coating layer, an amount of coating is in a range from 50 g/L to 300 g/L based on a unit volume of the substrate.

4. The exhaust gas purification catalyst according to claim 2,
  wherein in the catalyst coating layer, an amount of coating is in a range from 50 g/L to 300 g/L based on a unit volume of the substrate.

* * * * *